Dec. 20, 1949     B. W. BROUWER ET AL     2,491,917
CLOTH ROLL FOR LOOMS
Filed July 2, 1947
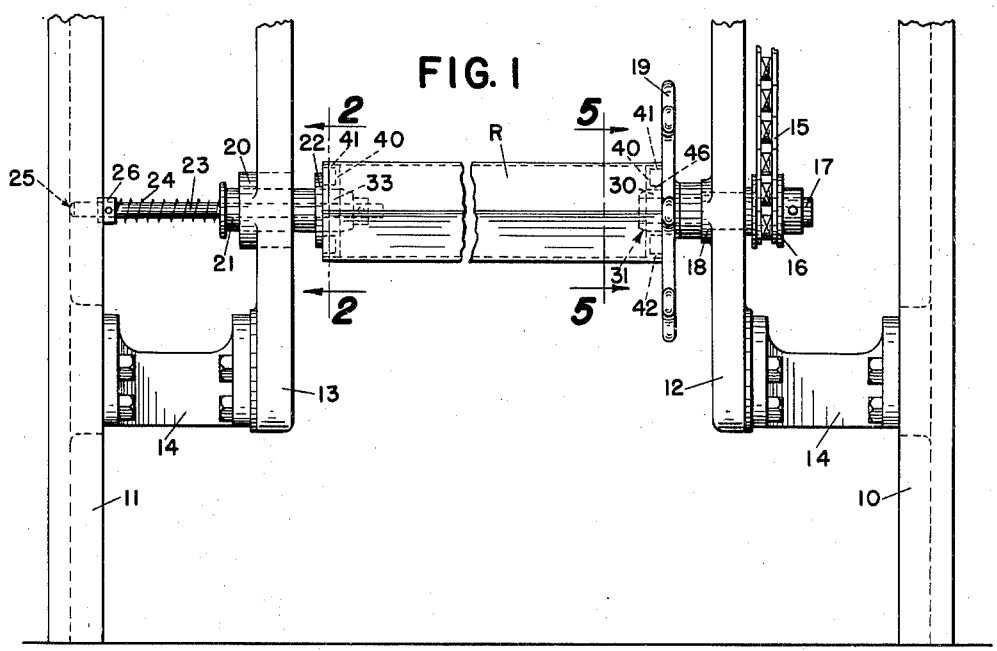
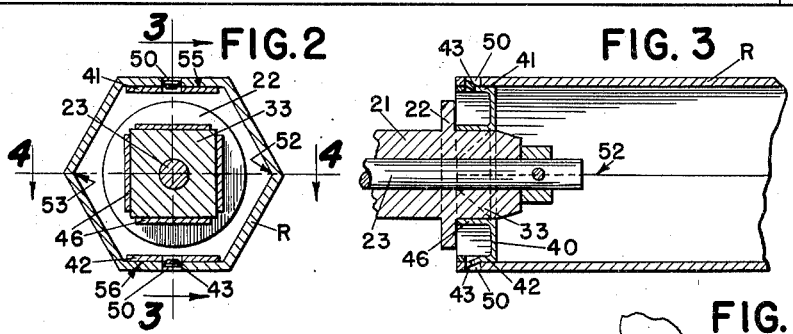
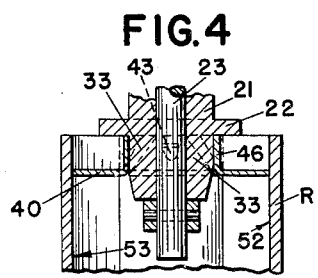
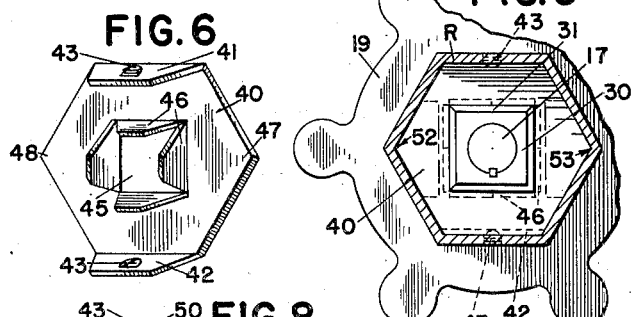
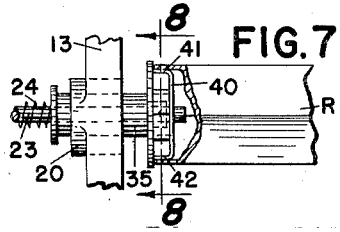
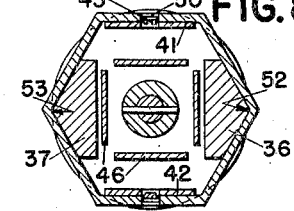
INVENTORS
BENJAMIN W. BROUWER
VICTOR F. SEPAVICH
Chas. T. Hawley
ATTORNEY Patented Dec. 20, 1949

2,491,917

UNITED STATES PATENT OFFICE 2,491,917

CLOTH ROLL FOR LOOMS

Benjamin W. Brouwer and Victor F. Sepavich, Worcester, Mass., assignors to Crompton & Knowles Loom Works, Worcester, Mass., a corporation of Massachusetts Application July 2, 1947, Serial No. 758,562

9 Claims. (Cl. 242—68)

This invention relates to cloth windup mechanisms for looms and it is the general object of the invention to provide a cloth roll adaptable for use with at least two different types of driving and mounting means.

For a great many years cloth rolls in looms have been wood cylinders with their ends provided with fittings made with square apertures to receive square driving clutch and mounting members. Rolls of this kind do not ordinarily establish a sufficiently close driving contact with the cloth and it has been necessary to employ tacking or clamps to enable these rolls to draw the cloth forwardly from the takeup mechanism.

Cloth rolls of polygonal cross section, such as hexagonal, are found to have the advantage of gripping the cloth sufficiently so that tacking and clamping is not necessary. When such a cloth roll is made of tubular form of a light weight metal, such as aluminum or magnesium or an alloy of these metals, it is desirable to be able to drive the roll with a clutch which fits certain of the corners of the roll. A tubular hexagonal cloth roll may be used on looms equipped with either the old square clutches or with a clutch which will fit it directly.

It is an important object of the present invention to provide a cloth roll so constructed that it can be driven by either of two different types of clutches, one of which, for instance, may be the old square type and the other of which may be a new type having angular faces to fit certain corners of the roll.

In order to adapt the roll for use with both types of clutches it is a more specific object of the invention to provide a fitting or web mounted interiorly of the roll and adapted to receive the old type of driving clutch but so constructed as to leave unobstructed certain interior corners for engagement with the new clutch.

Since looms of the same width having either the old or the new clutches should be able to take our improved cloth roll it is still another object of the invention to construct the ends of the roll so that the driving forces of both the old and new clutches will be in substantially the same plane. This result we accomplish by mounting the aforesaid fitting a short distance from the end of the roll and providing it with driving ears or wings for the old clutch which extend toward the end of the roll so as to lie in the same transverse plane as the internal corners of the roll which receive the new clutch.

With these and other objects in view which will appear as the description proceeds, our invention resides in the combination and arrangement of parts hereinafter described and set forth.

In the accompanying drawings, wherein a convenient embodiment of our invention is set forth, Fig. 1 is a front elevation of the lower part of the loom having our improved cloth roll applied thereto and showing the old or square type of driving and mounting means, Fig. 2 is an enlarged vertical section on line 2—2 of Fig. 1, Fig. 3 is a longitudinal vertical section on line 3—3 of Fig. 2, Fig. 4 is a longitudinal section on line 4—4 of Fig. 2, Fig. 5 is an enlarged vertical section on line 5—5 of Fig. 1, Fig. 6 is a perspective view of one of the fittings, Fig. 7 shows one end of the roll provided with a new type of mounting more particularly adaptable to hollow cloth rolls of polygonal cross section and Fig. 8 is an enlarged vertical section on line 8—8 of Fig. 7.

Referring more particularly to Fig. 1, we show right and left loomsides 10 and 11, respectively, and supports 12 and 13 connected to their respective loomsides by braces 14. The loom will be provided with a takeup mechanism (not shown) which will drive a chain 15 meshing with a sprocket 16 secured to a stub shaft 17 rotating in a bearing 18 formed on the right hand support 12 as viewed in Fig. 1. The left end of shaft 17 has keyed thereto a hand wheel 19 by which the cloth roll can be turned manually incident to removal of a cut of cloth from the loom.

The left hand support 13 is provided with a bearing 20 in which is slidably and rotatably mounted a tube 21 having a stop flange 22 near the right end thereof. A rod 23 extends through the tube 21 and is surrounded by a compression spring 24 which tends normally to push the tube 21 to the right. The left end of rod 23 engages the loomside 11 as at 25 and an adjustable collar 26 on rod 23 provides means for varying pressure exerted by the spring 24.

With both the old and new types of driving clutches heretofore mentioned the matter thus far described may be used in the usual manner. The old form of clutch, which is square in cross section, is shown for instance in Fig. 5 and includes a driving member 30 turning with shaft 17, being in fact part of hand wheel 19. This clutch member may be tapered as at 31.

The tube 21 will have its right hand end formed with a roll mounting 33 similar to clutch member 30, that is, it will be square in cross section, see Fig. 2. Both the clutch member 30 and the mounting 33 are of usual construction and of themselves form no part of the present invention.

The cloth roll R shown herein is preferably tubular and made of polygonal cross section, such as hexagonal as indicated in Fig. 2. The tube may be made of a light metal such as magnesium or aluminum or an alloy of either or both of these metals and can be made by an extrusion process. When the roll is hexagonal it will have opposite internal corners which can be engaged for both driving and mounting purposes by means similar to the parts 30 and 33 already described except for adaptation to the hollow roll. Thus, a tube 35 similar to tube 21 may be provided with lugs 36 and 37 having corners formed to fit the opposite internal corners of the rolls. The driving clutch may also be made in a manner similar to the construction set forth in Figs. 7 and 8 and will have lugs which will engage corners of the hollow roll.

In order that the cloth roll may be adaptable for use with both types of clutches and mountings we provide it with fittings one of which is shown in perspective in Fig. 6. This fitting has a flat body 40 which is cut to the same general shape as the cross section of the cloth roll and fits the interior of the latter. Extending laterally from the body 40 are top and bottom wings 41 and 42 each provided with an outwardly extending tongue 43 stamped therefrom and integral therewith.

Located centrally of the body 40 is an aperture 45 of a size to fit a square clutch or mounting member, and additional wings 46 extend laterally from the body 40 preferably on the same side thereof as are the wings 41 and 42. These wings 46 define a substantially square guideway for the square clutch or mounting member and are spaced far enough inwardly from the opposite corners 47 and 48 of the body 40 to receive the driving and mounting members 36 and 37. Those sides of the angular periphery of the body 40 adjacent to the corners 47 and 48 are left free and are not provided with wings similar to those shown at 41 and 42.

In adapting the fitting to the roll it will be pushed into the latter with the web 40 leading. The end of the roll will be provided with holes 50 cut in the opposite flat sides thereof along which the wings 41 and 42 extend, and as the fitting is pushed into the tube the tongues 43 will first be pressed down and then will snap upwardly into the holes 50, due to the resilience of the wings 41 and 42. The ends of the wings 41, 42 and 46 pointing away from the web 40 may align with the adjacent end of the cloth roll so that the parts will take generally the form shown in Fig. 3.

When the fitting 40 is in position on the roll the opposite internal corners 52 and 53 of the cloth roll which may fit snugly with the corners 47 and 48 of the web 40 will be free and unobstructed so that they can establish close driving and mounting relations with the lugs 36 and 37. The wings 46 point in a direction away from the web 40 and outwardly toward the end of the cloth roll and will lie in the same general transverse plane as that part of the corners 52 and 53 which can be engaged by their respective driving or mounting lugs. This arrangement makes possible the use of a cloth roll of a given length in two different looms of the same width, one having the square clutch and the other having the new type such as shown in Fig. 8.

The wings 41 and 42 are held firmly against the opposite flat internal surfaces 55 and 56, respectively, of the cloth roll by their resilience. It is to be understood however that we do not wish to be limited necessarily to the tongues 43 and the holes 50 for holding the fitting firmly in position on the cloth roll.

As shown more particularly in Fig. 3 flange 22, which is a usual part of the tube 21, is yieldingly held by spring 24 against the outer ends of the wings 46 to position the tube 21 and mounting 33 properly with respect to the cloth roll.

The cloth roll shown herein is hexagonal in cross section, but we do not wish necessarily to be limited to this particular polygonal form for the roll, although it has proved satisfactory in use.

From the foregoing it will be seen that we have provided a cloth roll adaptable for use with two different types of driving or mounting means one of which is of long standing use and more particularly adaptable for the old style wooden cylindrical cloth rolls and the other of which is particularly adaptable for the internal driving of tubular hexagonal cloth rolls. Even if by any circumstance the driving clutch should be square and the mounting means for the left end of the tube as shown in Fig. 1 should be of the newer form adaptable to polygonal drive, the roll can be used, since each end thereof will fit the part corresponding to it. It will also be seen that the fitting is made so as to expose unobstructed opposite corners for driving the roll by the newer type of clutch, but at the same time has wings which can establish firm connection between the fitting and the tube along those opposite faces thereof between which the unobstructed corners lie. It will further be seen that since the wings 41 and 42 and also the wings 46 point outwardly from the same side of the web 40, the cloth roll can be used in two different looms of the same width whether they have the old or new style driving and mounting means. The square clutch is smaller than and lies outside the outline of the newer clutch although this latter feature is not essential in all adaptations of the invention. The two clutches are of different configurations so shaped that each can be used without interfering with the roll driving operation of the other.

Having thus described our invention it will be seen that changes and modifications may be made therein by those skilled in the art without departing from the spirit and scope of the invention and we do not wish to be limited to the details herein disclosed, but what we claim is:

1. A cloth roll for use with looms having either of two driving clutches having different cross sections the contour of one of which when on the loom lies outside the space occupied by the contour of the other when the latter is on the loom, said roll comprising a hollow metallic tube of polygonal cross section, and a fitting within the tube having a central aperture to receive said one clutch and secured to the tube in a manner to leave unobstructed opposite corners for engagement with the other clutch.

2. A cloth roll for use with looms having either of two driving clutches of different cross sections the contour of one of which when on the loom lies outside the space occupied by the contour of the other when the latter is on the loom, said roll comprising a hollow metallic tube of hexagonal cross section, and a fitting within the tube formed with an aperture to receive said one clutch and having securing wings extending along opposite interior walls of the tube and having those portions thereof intermediate the wings substantially flat to leave the corresponding internal corners of the tube unobstructed to engage the other of said clutches.

3. A cloth roll for use with looms having either of two driving clutches one of which when on the loom lies outside the space occupied by the other clutch when the latter is on the loom, said roll comprising a hollow metallic tube of hexagonal cross section, a fitting extending across the interior of the tube and having a central aperture to receive said one clutch, and wings on opposite sides of the fitting having holding engagement with opposite interior surfaces of the tube and leaving the internal corners of the tube intermediate the wings unobstructed for cooperation with the other of said clutches.

4. A cloth roll for use with looms having either of two driving clutches one of which when on the loom lies outside the space occupied by the other clutch when the latter is on the loom, said roll comprising a hollow metallic tube of polygonal cross section, a fitting secured to the tube and having a substantially flat body within the tube extending transversely of the latter, said fitting having an aperture therein to fit said one clutch, and wings extending from the sides of said aperture toward the adjacent end of the tube spaced from certain opposite internal corners of the tube and leaving said corners unobstructed for engagement with the other of said clutches.

5. A cloth roll for use with looms having either of two driving clutches of different cross sections, said roll comprising a hollow metal tube of polygonal cross section, a fitting having a body within the tube extending transversely of the latter and spaced from the adjacent end of the tube, wings extending from said body toward said adjacent end and secured to certain of the internal walls of the tube, said fitting having an aperture to fit one of said clutches, and wings on the fitting extending from the sides of said aperture toward the adjacent end of the tube and spaced from certain of the internal corners of the tube to permit engagement of the latter with the other of said clutches.

6. In a cloth roll for use in looms having two types of driving clutches of different configurations, said roll comprising a hollow metallic tube or polygonal cross section, and a fitting secured to the interior of the tube and having an aperture therethrough to receive one of said clutches, said fitting being so constructed as to leave certain internal corners of the tube unobstructed for engagement with the other of said clutches.

7. In a cloth roll for a loom, said roll comprising a hollow metallic body of polygonal cross section, a fitting within the tube spaced from the end thereof and having a body extending transversely of the tube provided with an aperture to receive a driving member, and means on the body for holding the fitting to the tube in such manner as to leave certain internal corners of the tube unobstructed for engagement with a different driving clutch.

8. In a cloth roll for a loom, a hollow metallic tube of polygonal cross section, a fitting within said tube spaced from the end of the latter and having an aperture to cooperate with one form of driving clutch, and means on the fitting for securing the latter to certain internal walls of the tube and so disposed as to leave unobstructed certain internal corners of the tube for engagement with another form of clutch when the latter is between said fitting and the adjacent end of the tube.

9. In a cloth roll for a loom which may be provided with two forms of driving clutches which when in the loom have driving surfaces disposed in substantially the same plane transverse of the cloth roll, said roll including a hollow tube of polygonal cross section, a fitting within the tube having a body transverse of the tube and spaced from the end of the latter, means extending from said fitting toward the adjacent end of the tube to engage one of said clutches, and means on the fitting securing the latter to the tube in such manner as to leave certain internal corners of the tube unobstructed between said body and the adjacent end of the tube to engage the other of said clutches.

BENJAMIN W. BROUWER.
VICTOR F. SEPAVICH.

REFERENCES CITED

The following references are of record in the file of this patent:

UNITED STATES PATENTS

| Number | Name | Date |
| --- | --- | --- |
| 1,104,296 | Gammeter | July 21, 1914 |
| 1,332,330 | Gammeter | Mar. 2, 1920 |
| 1,742,270 | McNally | Jan. 7, 1930 |